(12) United States Patent
Lindenmeier et al.

(10) Patent No.: US 8,306,168 B2
(45) Date of Patent: Nov. 6, 2012

(54) RECEPTION SYSTEM FOR SUMMATION OF PHASED ANTENNA SIGNALS

(75) Inventors: Stefan Lindenmeier, Gauting (DE); Heinz Lindenmeier, Planegg (DE); Jochen Hopf, Haar (DE); Leopold Reiter, Gilching (DE)

(73) Assignee: Delphi Delco Electronics Europe GmbH, Troy, MI (US)

( * ) Notice: Subject to any disclaimer, the term of this patent is extended or adjusted under 35 U.S.C. 154(b) by 370 days.

(21) Appl. No.: 12/689,969

(22) Filed: Jan. 19, 2010

(65) Prior Publication Data

US 2010/0183095 A1    Jul. 22, 2010

(30) Foreign Application Priority Data

Jan. 19, 2009   (DE) .................. 1020090050639

(51) Int. Cl.
*H04B 7/10* (2006.01)

(52) U.S. Cl. ........ 375/347; 375/260; 375/267; 375/340; 455/101; 455/132; 455/296; 455/500; 455/562.1; 370/334; 341/173; 341/180

(58) Field of Classification Search .................. 375/260, 375/267, 340, 347; 455/101, 132, 296, 500, 455/562.1; 370/334; 341/173, 180
See application file for complete search history.

(56) References Cited

U.S. PATENT DOCUMENTS

| | | | |
|---|---|---|---|
| 3,942,119 A | 3/1976 | Meinke et al. | |
| 4,070,677 A | 1/1978 | Meinke et al. | |
| 4,079,318 A | 3/1978 | Kinoshita | |
| 4,085,368 A | 4/1978 | Yeh | |
| 4,095,228 A | 6/1978 | Meinke et al. | |
| 4,602,260 A | 7/1986 | Lindenmeier et al. | |
| 4,752,968 A | 6/1988 | Lindenmeier et al. | |
| 4,791,426 A | 12/1988 | Lindenmeier et al. | |
| 4,914,446 A | 4/1990 | Lindenmeier et al. | |
| 5,029,308 A | 7/1991 | Lindenmeier et al. | |
| 5,049,892 A | 9/1991 | Lindenmeier et al. | |
| 5,097,270 A | 3/1992 | Lindenmeier et al. | |
| 5,138,330 A | 8/1992 | Lindenmeier et al. | |
| 5,266,960 A | 11/1993 | Lindenmeier et al. | |
| 5,289,197 A | 2/1994 | Lindenmeier et al. | |
| 5,313,660 A | 5/1994 | Lindenmeier et al. | |
| 5,517,686 A | 5/1996 | Kennedy et al. | |
| 5,589,839 A | 12/1996 | Lindenmeier et al. | |
| 5,619,214 A | 4/1997 | Lindenmeier et al. | |
| 5,801,663 A | 9/1998 | Lindenmeier et al. | |

(Continued)

FOREIGN PATENT DOCUMENTS

DE        43 26 843        2/1995

(Continued)

OTHER PUBLICATIONS

U.S. Appl. No. 12/716,318, filed Mar. 3, 2010.

(Continued)

*Primary Examiner* — Leon Flores
(74) *Attorney, Agent, or Firm* — J. Gordon Lewis

(57) ABSTRACT

A diversity antenna system and method comprising a plurality of antennas, a plurality of switches and a plurality of phase shifters, wherein the switches and the antennas are selectively opened and closed or switched on an off to achieve equiphasing. This system separates the noise signal from the useful signal in order to achieve a proper determination of the different phases. In addition there is a receiver which is configured to receive the output of the diversity system. The logic control unit is configured to perform particular steps or algorithms in order to achieve equiphasing of the received signals.

20 Claims, 6 Drawing Sheets

U.S. PATENT DOCUMENTS

| | | | |
|---|---|---|---|
| 5,818,394 A | 10/1998 | Aminzadeh et al. |
| 5,826,179 A | 10/1998 | Lindenmeier et al. |
| 5,850,198 A | 12/1998 | Lindenmeier et al. |
| 5,905,469 A | 5/1999 | Lindenmeier et al. |
| 5,926,141 A | 7/1999 | Lindenmeier et al. |
| 5,929,812 A | 7/1999 | Aminzadeh |
| 5,949,498 A | 9/1999 | Rudolph |
| 5,973,648 A | 10/1999 | Lindenmeier et al. |
| 6,011,962 A | 1/2000 | Lindenmeier et al. |
| 6,123,550 A | 9/2000 | Burkert et al. |
| 6,130,645 A | 10/2000 | Lindenmeier et al. |
| 6,140,969 A | 10/2000 | Lindenmeier et al. |
| 6,169,888 B1 | 1/2001 | Lindenmeier et al. |
| 6,184,837 B1 | 2/2001 | Lindenmeier et al. |
| 6,188,447 B1 | 2/2001 | Rudolph et al. |
| 6,218,997 B1 | 4/2001 | Lindenmeier et al. |
| 6,236,372 B1 | 5/2001 | Lindenmeier et al. |
| 6,313,799 B1 | 11/2001 | Thimm et al. |
| 6,317,096 B1 | 11/2001 | Daginnus et al. |
| 6,377,221 B1 | 4/2002 | Lindenmeier et al. |
| 6,400,334 B1 | 6/2002 | Lindenmeier et al. |
| 6,421,532 B1 | 7/2002 | Lindenmeier et al. |
| 6,430,404 B1 | 8/2002 | Lindenmeier et al. |
| 6,473,594 B1 | 10/2002 | Piirainen |
| 6,574,460 B1 | 6/2003 | Lindenmeier et al. |
| 6,603,434 B2 | 8/2003 | Lindenmeier et al. |
| 6,603,435 B2 | 8/2003 | Lindenmeier et al. |
| 6,611,677 B1 | 8/2003 | Lindenmeier et al. |
| 6,633,258 B2 | 10/2003 | Lindenmeier et al. |
| 6,653,982 B2 | 11/2003 | Lindenmeier et al. |
| 6,768,457 B2 | 7/2004 | Lindenmeier |
| 6,888,508 B2 | 5/2005 | Lindenmeier |
| 6,911,946 B2 | 6/2005 | Lindenmeier |
| 6,917,340 B2 | 7/2005 | Lindenmeier |
| 6,925,293 B2 | 8/2005 | Lindenmeier et al. |
| 6,927,735 B2 | 8/2005 | Lindenmeier et al. |
| 6,956,533 B2 | 10/2005 | Lindenmeier |
| 7,127,218 B2 | 10/2006 | Lindenmeier |
| 7,403,167 B2 | 7/2008 | Probst et al. |
| 7,555,277 B2 | 6/2009 | Lindenmeier et al. |
| 7,564,416 B2 | 7/2009 | Lindenmeier et al. |
| 7,702,051 B2 | 4/2010 | Lindenmeier et al. |
| 2001/0016478 A1 | 8/2001 | Lindenmeier et al. |
| 2002/0118138 A1 | 8/2002 | Lindenmeier et al. |
| 2002/0126055 A1 | 9/2002 | Lindenmeier et al. |
| 2002/0154059 A1 | 10/2002 | Lindenmeier et al. |
| 2002/0171600 A1 | 11/2002 | Lindenmeier et al. |
| 2002/0196183 A1 | 12/2002 | Lindenmeier |
| 2003/0164802 A1 | 9/2003 | Lindenmeier |
| 2004/0113854 A1 | 6/2004 | Lindenmeier |
| 2004/0160373 A1 | 8/2004 | Lindenmeier |
| 2004/0164912 A1 | 8/2004 | Lindenmeier et al. |
| 2004/0183737 A1 | 9/2004 | Lindenmeier |
| 2004/0198274 A1 | 10/2004 | Lindenmeier |
| 2006/0082494 A1 | 4/2006 | Deininger et al. |
| 2006/0114146 A1 | 6/2006 | Lindenmeier et al. |
| 2006/0182201 A1 | 8/2006 | Lindenmeier et al. |
| 2007/0058761 A1 | 3/2007 | Lindenmeier |
| 2007/0140389 A1 | 6/2007 | Lindenmeier et al. |
| 2008/0218422 A1 | 9/2008 | Lindenmeier et al. |
| 2008/0248770 A1 | 10/2008 | Schutz et al. |
| 2008/0260079 A1 | 10/2008 | Lindenmeier et al. |
| 2009/0036074 A1 | 2/2009 | Lindenmeier et al. |
| 2009/0042529 A1 | 2/2009 | Lindenmeier et al. |
| 2009/0073072 A1 | 3/2009 | Lindenmeier et al. |
| 2010/0066618 A1 | 3/2010 | Heuer |

FOREIGN PATENT DOCUMENTS

| | | |
|---|---|---|
| DE | 10 2006 057 520 | 6/2007 |
| EP | 1798870 A2 | 6/2007 |
| WO | 9834358 | 8/1998 |

OTHER PUBLICATIONS

U.S. Appl. No. 12/786,236, filed May 24, 2010.
European Search Report dated May 31, 2012.
Phase Estimation for Coherent Optical OFDM, Xingwen Yi, William Shieh, and Yan Tang, IEEE Photonics Technology Letters, vol. 19, No. 12, Jun. 15, 2007.
Unified Analysis of Generalized Selection Diversity with Normalized Threshold Test per Branch, A. Annamalai, G. Deora and C. Tellambura, Mobile and Portable Radio Research Group, pp. 752-756.

RECEPTION SYSTEM FOR SUMMATION OF PHASED ANTENNA SIGNALS

CROSS REFERENCE TO RELATED APPLICATIONS

This application hereby claims priority under 35 U.S.C. 119 from German Application Serial No. 10 2009 005 063.9 filed on Jan. 19, 2009, the disclosure of which is hereby incorporated herein by reference.

BACKGROUND

One embodiment relates to a reception system for frequency-modulated or phase-modulated high-frequency signals for vehicles having a multi-antenna system 1 having at least two antennas and having at least one switch or switching element and at least one individually adjustable phase rotation element, of a linear combination circuit situated in the reception path of at least one of the at least two antennas.

An example of a known antenna diversity system is found from the disclosure of U.S. Pat. No. 5,517,686, U.S. Pat. No. 4,079,318, as well as DE 43 26 843. These diversity systems are aimed at achieving a greater combined signal, by means of equiphase superimposition of two or even more reception signals, than with an individual antenna, in order to thereby reduce the likelihood of level collapses in a territory with multi-path propagation. In this way, a more advantageous signal/noise ratio is obtained in the combined signal, with regard to the receiver noise, on average.

U.S. Pat. No. 5,517,686, provides an example of equiphasing of two reception signals which is produced by means of using an ancillary modulation. For this purpose, one of the two reception signals is modulated in amplitude. In the reception path of one of the two antennas Ant1, Ant2 in U.S. Pat. No. 5,517,686 there is a controllable phase rotation element. If the two reception signals are superimposed in the receiver, the frequency modulation in the sum signal produced by means of the ancillary modulation only disappears if the two reception signals possess the same phase. If the two phases of the superimposed reception signals are not the same, then the sum signal is additionally modulated in frequency with the tone of the ancillary modulation. The tone of the ancillary modulation is detected in the frequency demodulator using a regulation device, and the phase rotation element is adjusted, by means of the regulations, in such a manner that the tone of the ancillary modulation in the sum signal disappears, and thus the two reception signals are superimposed with the same phase. This method according to the state of the art possesses the significant disadvantage, however, that an additional signal in the form of an ancillary modulation has to be imposed onto the reception signals to be received, in order to bring about equiphasing. In DE 10 2006 057 520, a reception system with equiphasing of reception signals E1, E2 ... EN is described, which advantageously makes do without such ancillary modulation. A reception system of this type can particularly be used in mobile systems with digitally modulated signals, according to the MPSK method, such as, for example, in modern radio satellite reception systems according to the QPSK method. Equiphasing is achieved by means of successive separate determination of the voltages of the different antennas Ant1, Ant2 ... AN, using an algorithm for calculating the phases that are turned on in the different antenna branches. A diversity array of this type is connected with the problem that weak reception signals E1, E2 ... EN having a large noise component do not precisely allow equiphasing, and that the signal-to-noise ratio (SNR) in total is too poor. This particularly holds true in reception territories with marked multi-path propagation with strong reception level collapses. In DE 10 2006 057 520, several methods for equiphasing are described, which is brought about using the power levels of the reception signals of the antennas Ant1, Ant2 ... AN.

It is known that the data stream of every digital signal transmission contains signals referred to as "burst signals" or "frame data" for synchronization of the transmission, which are established in accordance with the appropriate standard, and repeatedly transmitted at the time interval of the frame period TR. The burst signal contains symbols that contain the reference phase 80 for phase synchronization of the system. In particular, in order to assure reliable synchronization to the symbol cycle even at high speeds, both the frame frequency and the burst signal period TB of the burst signal, in terms of time, must be selected to be appropriately large. The data contained in the symbols received between the burst signals thus consists of the current phase deviation, in each instance, of the high-frequency carrier oscillation from the reference phase 80 present in the receiver, which is derived from the burst signals. The receiver-side detection of the carrier phases contained in the useful symbols transmitted can then take place in the receiver, in secured manner, if the signal/noise ratio (SNR) is sufficiently great and the system is synchronized to the symbol cycle by means of the burst signals. A fundamental problem, however, results from the fact that in the case of mobile reception, the carrier phase varies greatly, over the travel routes, in a reception field in which interference results from multi-path propagation, whereby these variations lead to incorrect detection of the symbols, for example if, in the case of a 4PSK system, for example, the error phase deviation is not recognizably less than $\pm\pi/4$. The reference phase of the reception signal is present in the receiver in constantly updated form, on the basis of the burst signals that are received at sufficiently short time intervals. This means that the phase of the transmission function of the radio field and thus of the reception signal, which constantly changes in mobile operation, is always correctively rotated in the receiver, using the reference phase 80, in such a manner that the individual symbols that carry the data are assigned in each instance to the correct phase quadrant with regard to this reference phase 80, if this signal is present at a sufficiently great SNR. The combined signal 8 of the multi-antenna system 1 is maximal when the individual reception signals E1, E2, ... EN in the combination circuit are superimposed with the same phase, in a common phase location—referred to as the nominal phase—the difference of which, in the receiver, at any point in time, relative to the reference phase 80 present there, represents the symbol data. The individual reception signals E1, E2 ... EN are therefore supposed to be superimposed under a common nominal phase, in the combined signal 8. The nominal phase is therefore a phase that is common to all the reception signals E1, E2 ... EN, by means of a corresponding setting of the phase rotation elements, which phase possesses a value that is at first indefinite with regard to the reference phase. At the moment of reception of reference symbols in a burst signal, their system-specific phases thus yield the reference phase 80 in the receiver, up to the next update of the reference phase 80 by means of subsequent burst signals with additional reference symbols. Particularly, in the case of reception in poorly supplied territories, the reception signals E1, E2 ... EN are frequently very noisy, so that the reception mechanism described is not error-free and the system, because of frequent incorrect detection of the symbols overly great bit error rates occur, which desynchronize the system.

SUMMARY

One embodiment is based on the task of indicating a diversity reception system, in which equiphasing of reception signals E1, E2, ... EN takes place reliably even in the presence of a great noise component, and which improves the signal-to-noise ratio (SNR) in the combined signal.

One way to accomplish this task is through one embodiment which relates to a reception system for frequency-modulated or phase-modulated high-frequency signals for vehicles having a multi-antenna system 1 having at least two antennas and having at least one individually adjustable phase rotation element of a linear combination circuit situated in the reception path of at least one of the at least two antennas. This embodiment can have a subsequent receiver circuit, and also have individually adjustable switching elements for switching through or interrupting the signal flow in the reception path of at least one of the antennas. The reception signals conducted by way of the phase rotation elements and the adjustable switching elements are passed to the linear combination circuit and the combined signal is passed to the receiver circuit.

One particular advantage is that because of the separate determination of the levels, of only the useful signal component that is contained in the individual noisy reception signals, these levels are determined, in each instance by the amplitude of the high-frequency oscillation of the useful signal in the noisy reception signals. Therefore, equiphasing of the useful reception signals 3 can be brought about in a precise manner by using the useful signal levels 4 and one of the methods indicated in German patent application DE 10 2006 057 520. U.S. patent application Ser. No. 11/611,483 titled Reception System With Phase Alignment of Antenna Signals was filed on Dec. 16, 2006 and claimed priority to German Patent Application DE 10 2006 057 520, wherein the disclosure of the '483 application is incorporated herein by reference. It is noted that the '483 application has been published as U.S. Publication No. 20070140389 on Jun. 21, 2007.

This results in the decisive advantage that when receiving digital satellite signals, for example, reliable symbol detection is possible even with a small link budget and under difficult reception conditions.

Another advantage of a reception system is that the number of antennas can be increased, without great economic expenditure, in the interests of improving the signal-to-noise ratio (SNR), and only one high frequency HF cable has to be present between antenna and receiver.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
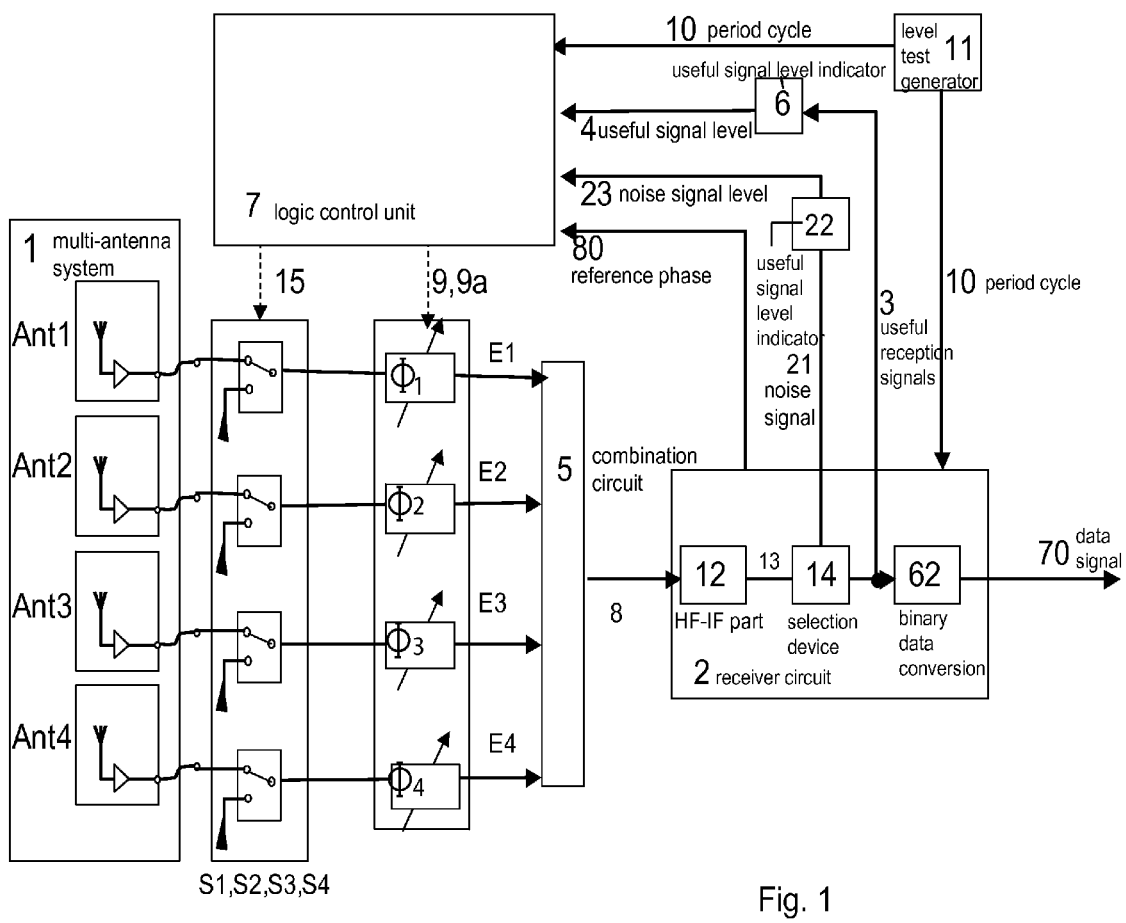
FIG. 1 discloses a schematic block diagram of a first embodiment of a reception system.

FIG. 1 shows a reception system having a multi-antenna system 1 with antennas Ant1, Ant2 ... AN.

This reception system also has switching elements S1, S2 ..., phase rotation elements $\Phi1, \Phi2 ...$, a combination circuit 5 for summation of the reception signals E1, E2 ... of the individual antennas Ant1, Ant2 ... AN of the multi-antenna system 1. There is also a subsequent receiver circuit 2 having HF-IF part 12 and selection device 14 for separation of the useful reception signal 3 and the noise signal 21 in the combined signal 8, i.e. in the noisy signal 13 at the output of the HF-IF part 12. Conversion of the analog signals to the data signal 70 that is displayed takes place in usual manner, by means of binary data conversion 62.

Detection of a useful signal level 4 occurs by way of detector 6, and detection of the noise signal level 23 occurs by way of the noise signal level indicator 22 and evaluation of the levels in the logic control unit 7, which turns on the switching elements S1, S2 ... occurs by way of the switch setting signals 15 and the phase rotation elements $\Phi1, \Phi2, ...$ by way of the phase setting signals 9, 9a. This logic circuit 7 selectively activates particular switches and particular phase rotation elements to perform equiphasing of the useful signal components of the reception signals E1, E2 ... En.

This embodiment is based on equiphasing of antenna signals on the basis of a selective measurement of the level of the useful signal and of the noise that are contained in the reception signal, in each instance. One purpose of this embodiment is to select the noise signal 21 of the noisy reception signal E1, E2 ... and to subsequently determine, by calculations, phase differences between current amplitudes of the high-frequency carriers of the different reception signals E1, E2 ... of the individual antennas Ant1, Ant2 ... AN of the multi-antenna system 1. In this case, the calculations are performed on signals freed of the noise signal 21. The reception signals E1, E2 ... which are freed of noise are referred to as useful reception signals 3 in the following description.

The method presupposes that a radio transmission channel undergoes sufficiently little change during the process of equiphasing of the useful reception signals 3 so that the amplitudes of the high-frequency carriers in the reception signals E1, E2 ... are sufficiently constant during adjustment of the equiphasing. Thus, some modulation methods are eliminated. Particularly those modulation methods in which rapid amplitude changes occur due to modulation, so that during adjustment of the equiphasing, the amplitude of the transmitted high-frequency carrier does not remain sufficiently constant, and are eliminated for use in this embodiment. After having knowledge of the phase differences, the phase rotation elements $\Phi 1$, $\Phi 2$ ... are set by means of phase setting signals 9, 9a generated in the control unit 7, so that the useful reception signals 3 in the corresponding reception signals E1, E2, ... EN assume the same phase or substantially the same phase, and are superimposed in the combination circuit 5 with this nominal phase.

For this purpose, the receiver circuit 2 performs a selection using a selection device 14, between the useful reception signal 3 and the noise signal 21, in the combined signal 8, and the useful signal level 4 and the noise signal level 23 at the output of the selection 14 are passed to logic control unit 7 by way of a useful signal level indicator 6 and a noise signal level indicator 22, respectively. By means of cyclically switching through only one of the antennas Ant1, Ant2 ... AN, in each instance, within the scope of a test cycle for equiphasing, first the signal-to-noise ratios (SNR) of the individual reception signals E1, E2, ... EN are determined by the logic control unit 7. Thus, logic control unit 7 selects only those reception signals E1, E2, ... EN whose signal-to-noise ratio (SNR) exceeds a required minimum measure selected as the criterion for the further setting process. In a further process of the test cycle, the reception signals E1, E2, ... EN, i.e. their useful reception signals 3, are made almost equal in phase by means of successive turn-on using the switch setting signals 15 and by means of the settings of the phase rotation elements $\Phi 1$, $\Phi 2$, $\Phi N$. These settings are determined in the logic control unit 7 on the basis of the useful reception signals 3 or the useful signal levels 4. This setting causes the signal-to-noise ratio (SNR) in the combined signal 8 to be practically maximal or optimal or at least approach an optimal or maximal level. The phases of the useful reception signals 3 at the output of the selection device 14 are determined in a digital signal processing, in fixed, sufficiently small level test cycle time intervals $T_z$, by means of level test circuits. This occurs by means of setting the switches S1, S2, ... and the phase rotation elements $\Phi 1$, $\Phi 2$, ..., whereby the period of the level test circuits is selected to be so short that it lies in the range of a few symbol lengths (up to approximately 100) of the data signal to be transmitted. This occurs directly subsequent to determination of the phases of the useful reception signals 3, and results in almost equiphasing of the reception signals E1, E2, ... EN in the sense of optimization of the Signal to Noise Ratio (SNR). The test cycles are triggered by a period cycle 10 at the level test cycle time intervals $T_z$, wherein this cycle is generated by a level test cycle generator 11 and passed to the logic control unit 7 and the receiver circuit 2 for control of the system. Multiple possibilities are available for determination of the phases in digital signal processing.

It lies in the nature of a dynamic setting process that in the event of an overly poor signal/noise ratio after a test cycle, while equiphasing can be set in updated manner, this new nominal phase deviates, in incorrect manner, from the correct nominal phase.

In one of the basic forms of the present embodiment, the phase deviation $\Delta\Phi$ is balanced out. This phase deviation $\Delta\Phi$ is of the nominal phase of the useful reception signal 3 in the combined signal 8 from the reference phase 80 determined in receiver circuit 2 during reception of reference symbols, which is possible due to the phase settings undertaken after the test cycles, for equiphasing of the useful reception signals 3. This phase deviation $\Delta\Phi$ is balanced out in such a manner that the phase deviation $\Delta\Phi$ that is determined is passed to the logic control unit 7, by means of which the phase rotation elements are set in accordance with the adjustment, thereby causing all the useful signals 3 of the reception signals E1, E2, ... EN to assume their common nominal phase in the form of the reference phase.

Figure 2:
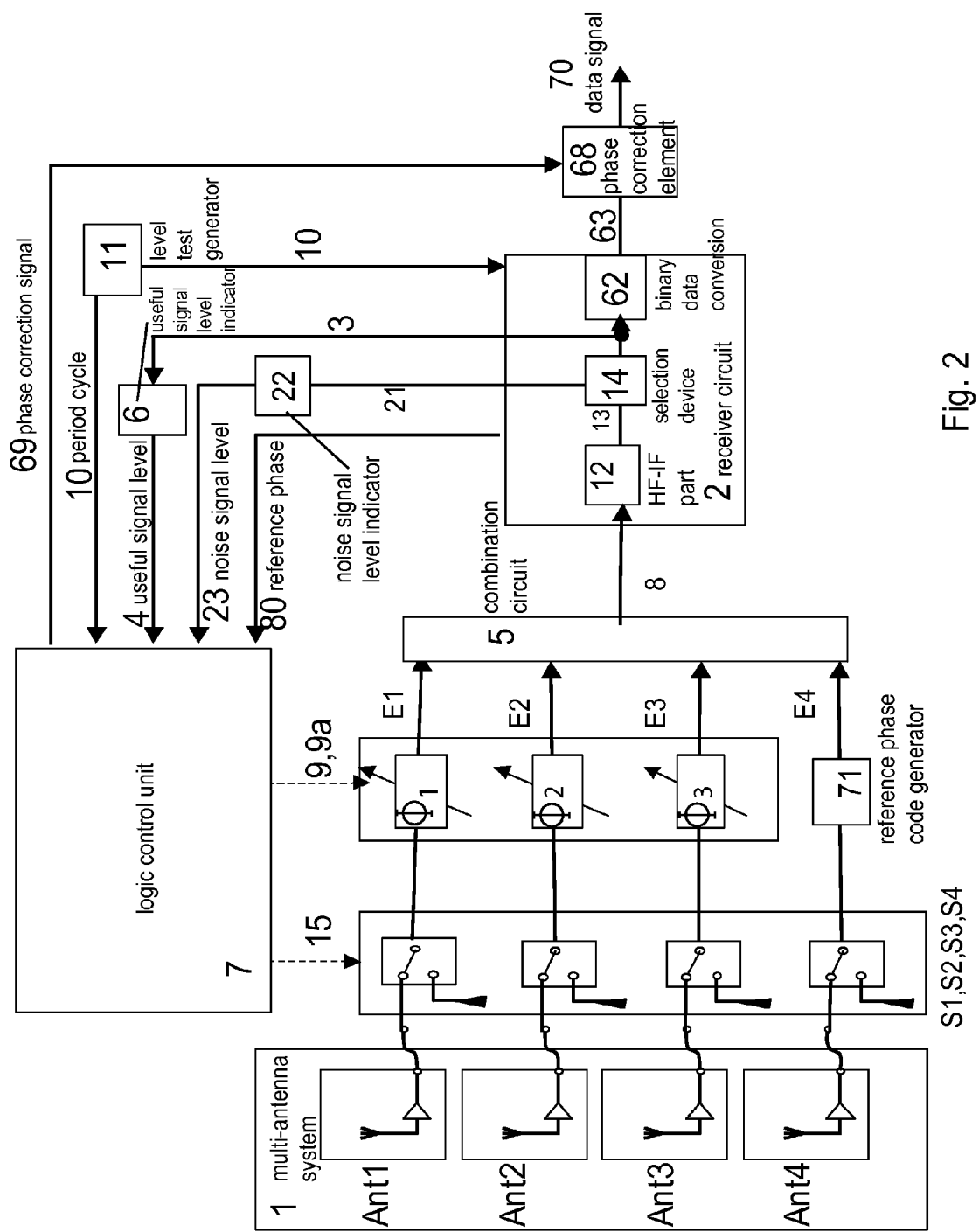
FIG. 2 shows the reception system as in FIG. 1, but with a reference phase generated in the receiver circuit, for phase correction of the phased combined signal.

As one possibility for ensuring true phasing of the system, FIG. 2 shows a phase correction element 68, controlled by the phase correction signal 69, which is turned on in the receiver, by the logic control unit 7, before phase detection. Phase correction element 68 is turned on to balance out the incorrect phase deviations of the nominal phase that are possible due to the phase settings undertaken during the test cycles. Upon reception of reference symbols, the phase deviation of the incorrect new nominal phase from the reference phase 80 is determined in the receiver, and passed to logic control unit 7 to turn on the phase correct element 68 in accordance with the required phase correction. Thus, the phase-modulated signal in the receiver circuits 2 is not distorted by the equiphasing process.

FIG. 2 shows another embodiment wherein the individual useful reception signals 3 of reception signals E1, E2 ... EN can therefore be superimposed in combined signal 8 under any desired but common nominal phase. The nominal phase with subsequent phase correction element 68 is therefore a phase which is common to all the antenna useful reception signals 3, at all times. Upon reception of reference symbols in a burst signal, their phase is therefore the reference phase 80, until reception of the next update of the reference phase 80 by means of further burst signals. This means that the phase of the transmission function and thus of the reception signal of an antenna, which constantly changes during mobile operation, is constantly evaluated in the receiver, on the basis of the reference phase 80, correcting the phase, so that the individual QPSK symbols, for example, which transmit the data, are correctly assigned to the phase quadrant, in each instance. Of course, it is necessary for this signal to be present at a sufficiently great signal to noise ratio or (SNR).

The time intervals $T_z$ between the level test cycle signals are sufficiently short, so that the route traveled during this time interval $T_z$ does not amount to more than ⅕ of the length of the high-frequency carrier wave. While the time period could be no more than ⅕ of the length, in another preferred embodiment the time period could be ⅕ of the length of the high frequency carrier wave. In this case, the high frequency carrier wave is the wave such as a radio wave transmitted by a transmitter such as a radio transmitter.

Figure 3:
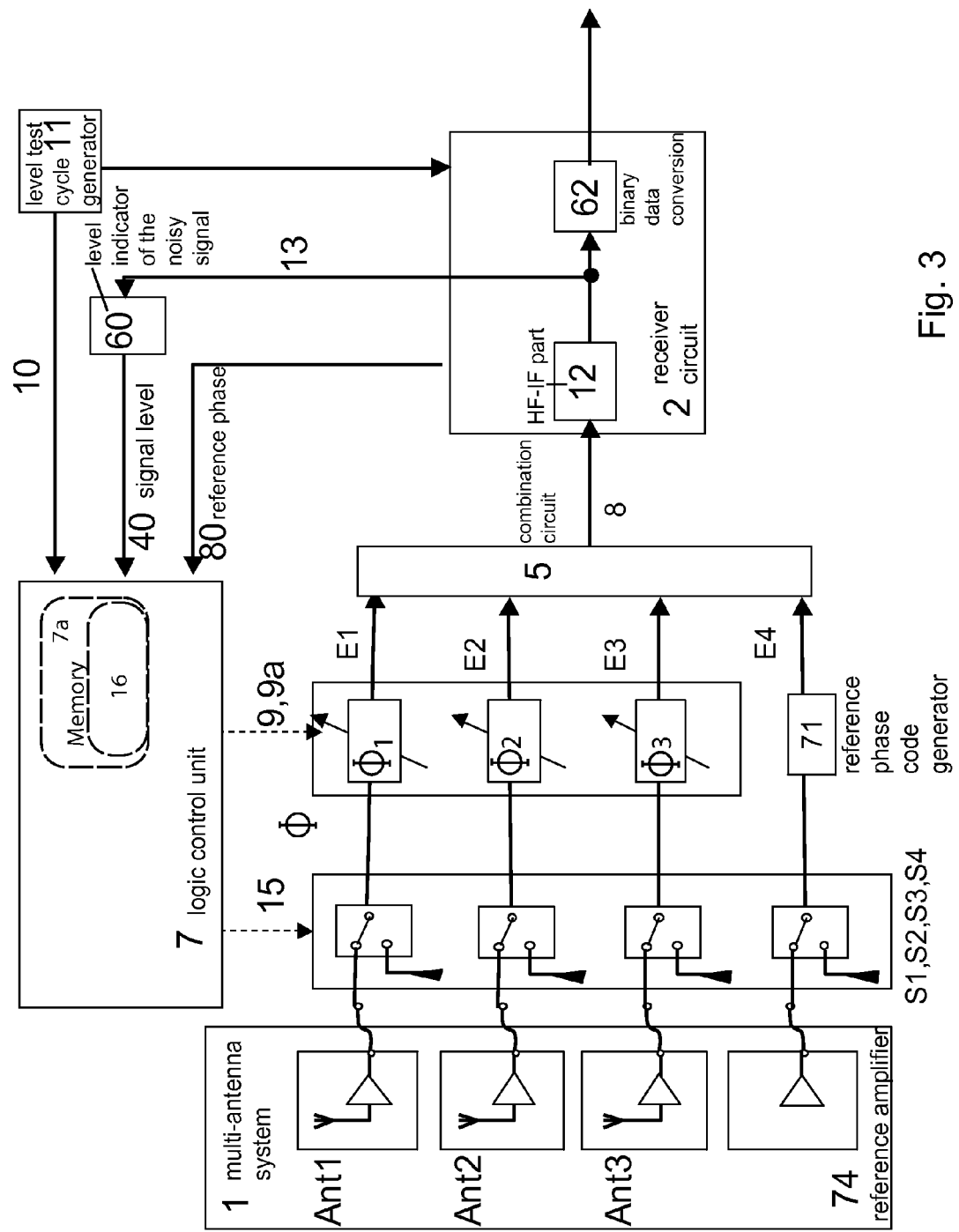
FIG. 3 shows the reception system similar to the embodiment as shown in FIG. 2, whereby the representative noise signal level is obtained using a reference amplifier.

FIG. 3 shows another embodiment, which is configured to work in the case of transmitter-side emission of a burst signal, with a series of reference symbols having a known but different reference phase 80, in each instance, in the form of a code word. In this case a code word is a preset reading that is present with a burst signal.

With this design, the phase deviation $\Delta\Phi$ of the useful signal 3 in the combined signal 8 is determined on the receiver side as an average value of the individual phase deviations from the reference phase 80 of the group of the reference symbols of the code word. In this way, it is prevented, with great certainty, that in the event of uncertain transmission of individual burst signals, the reference phase 80 is incorrectly recognized in the receiver circuit 2. In this connection, the group of reference symbols defined by the code word does not necessarily have to consist of reference symbols that are transmitted one directly after the other. This method of procedure can also be applied to code words that contain a defined number of useful symbols between consecutively transmitted reference symbols, in each instance. Thus, in the presence of individual burst signals, this design prevents, with great certainty, an incorrect reading of reference phase 80 in receiver circuit 2.

In another advantageous embodiment, the test cycle for equiphasing of the useful reception signals 3 during reception of reference symbols is structured so that only one of the reception signals E1, E2 . . . is successively switched through using the switch setting signals 15, in each instance. In this connection, the deviation of the useful reception signal 3 of the reception signal E1, E2 . . . from the reference phase 80 is received, in each instance, which is displayed in the receiver when reference symbols are received. This deviation is passed to the logic control element 7 as a phase difference $\alpha i$. In logic control element 7, a phase setting signal 9, 9a is generated, in each instance, by means of which adjusts the phase value of the phase rotation element $\Phi 1$, $\Phi 2$, . . . in question that is suitable for setting the phase difference $\alpha i$ to zero. Thus, equiphasing is achieved by means of cyclically exchanging all the reception signals E1, E2 . . . En. This method of procedure is particularly effective if the entire test cycle for equiphasing of all the useful reception signals 3 takes place during reception of a burst signal with the reference symbols contained in it. In this connection, the reference phase 80 can be determined for every step of the cyclical equiphasing process, using reference symbols received consecutively.

In another advantageous embodiment, the deviation from the reference phase 80 displayed in the receiver is determined. This deviation can be determined when a burst signal is transmitted by the transmitter, comprising a group of reference symbols having different reference phases 80, in the form of a code word. This determination is in the form of the average value of the individual phase deviations from the reference phase of the group of reference symbols of the code word stored in the receiver, and this average value is passed to the logic control unit 7 as a phase difference $\alpha i$ when the related reception signal E1, E2 . . . is switched through.

As stated above, the entire test cycle for equiphasing of all the useful reception signals 3 is supposed to occur, in each instance, during reception of a burst signal with the reference symbols contained in the burst signal in the form of a code word. Thus, in advantageous manner, for every step of the cyclical equiphasing process, the average value of the individual phase deviations, in each instance, from the reference phase of the group of reference symbols can be determined as part of the code word for setting the phase rotation element $\Phi 1$, $\Phi 2$, . . . in question. Thus, equiphasing of all the useful signals 3 in the reception signals E1, E2 . . . can occur by means of cyclical replacement, on the basis of parts of the code word received consecutively within a burst signal, in the form of reference symbol groups.

The determination of the phases of the useful reception signals 3 by means of measuring the phase of the reference phase signal 8 in the receiver 2 can be performed during reception of the reference phase signal transmitted by the transmitter. This can be performed within the scope of a level test cycle, wherein only one antenna signal, in each instance, is switched through by the switches S1-S4, and thus the phase of the useful reception signal 3 is determined on the antenna in question and stored in the control unit 7. This process is performed for all the antennas, one after the other, until the phases of all the useful antenna signals 3 have been stored in memory and equiphasing of the useful antenna signals 3 is derived from this, by means of setting the phase rotation elements, by means of control unit 7.

Equiphasing of the useful reception signals 3 in the noisy reception signals E1, E2 . . . EN can occur, for example, by means of determining the useful signal levels 4 as components in the reception signals E1, E2 . . . EN. For this purpose, the following algorithm for a multi-antenna system having N antennas Ant1, Ant2 . . . AN and switching elements S1, S2 . . . SN and phase rotation elements $\Phi 1$, $\Phi 2$ $\Phi n$ and a combination circuit 5 can be used. With the algorithm 16 stored in the computer device or logic control unit 7, for determining the phase differences of the reception signals E1, E2 . . . EN present at the input of the combination circuit 5, by means of calculations, a level test cycle signal 10 is structured so that in the beginning, two useful signal level samples 4 are obtained. This occurs with alternative closing of two switching elements S1, S2 of a first and a second antenna Ant1, Ant2 . . . AN, and a level measurement sample is obtained with simultaneous closing of the two switching elements S1, S2 that belong to these antennas Ant1, Ant2, with the open state of all the other switching elements S3, . . . SN, in each instance, and the phase difference between the related reception signal E1, E2 found at the input of the combination circuit 5 is calculated from these three useful signal level samples 4.

In addition, equiphasing of the two reception signals E1, E2 is given by means of setting the phase rotation element $\Phi 2$. If necessary for successive equiphasing of the reception signal of another antenna Ant3, the switching elements S1, S2 can be switched in the same direction. These switching elements S1, S2, of the phase rotation elements $\Phi 1$, $\Phi 2$ of the antennas Ant1, Ant2 have already been set for equiphasing—while maintaining the setting of the phase rotation elements $\Phi 1$, $\Phi 2$. In this case, the two first antennas Ant1, Ant2 that have been combined in this manner take the place of the previously first antenna Ant1 with regard to the sequence of equiphasing, and the switching element S3 of the additional antenna Ant3 is set corresponding to the previously second antenna Ant2 for determining corresponding useful signal level samples 4. In this case, equiphasing of the reception signals E1, E2, E3 at the input of the combination circuit 5 is set, by means of setting the phase rotation element $\Phi 3$ of the additional antenna Ant3 using the phase difference determined, and so on, until equiphasing has been produced for all N reception signals E1, E2, E3, . . . EN, by repeating the process.

Equiphasing of the reception signal E3 can be performed analogously, in that first, the level of the combined signal is determined and stored in the computer device, or logic control unit 7. By opening the switching elements S1 and S2, and by closing the switching element S3, the amplitude A3 is first determined using the shortest possible level measurement sample having a level test period $T_p$, and stored in the memory of the computer device or logic control unit 7, to subsequently determine the level of the newly combined signal in selection device 14 that occurs when the switching elements S1 and S2 and S3 are closed. In this connection, the level test period $T_p$ should preferably be selected to be as short as is possible according to the reception channel bandwidth. In an analogous manner, equiphasing of the reception signal E3 with the two reception signals E1 and E2 that have already been phased, is then brought about using the level of the previous combined signal in selection device 14, of the reception signal E3, as well as of the new combined signal in selection device 14. This method can be applied analogously for equiphasing of as many N additional reception signals EN of N antennas Ant1, Ant2 . . . AN as desired.

In another embodiment, selection of the useful signal 3 relative to the noise signal 21 (See for example FIG. 1, FIG. 2) is such that the noise level of the reception system 2 is stored in memory in the logic control unit 7, and the power level of the noisy signal 13 is measured. The power level of the useful signal 3 is determined in that the noise power level is subtracted from the power level of the noisy signal 13. Thus, the amplitude of the useful oscillation of the useful signal 3 is also determined.

FIG. 3 shows a reception system as in FIG. 2, whereby the representative noise signal level is obtained using a reference amplifier. In this connection, the determination of the noise power level is performed by means of adding a reference amplifier whose power is detected, and measurement of the power of the noisy reception signal E1, E2, . . . of an antenna Ant1, Ant2 . . . AntN, by means of adding this antenna Ant1, Ant2 . . . AntN. The power 40 of the noisy reception signal 13 is determined by the level indicator 60 of the noisy signal. The selection of the useful reception signal 3 relative to the noise signal is performed, when the noise power level and the power of the noisy reception signal E1, E2, . . . are known, so that the noise level of the reception system 2 is stored in memory in the logic control unit 7. In this process, the power level of the noisy signal is measured as a useful and noise signal 13, and the power level of the useful reception signal 3 is determined in that the noise power level is subtracted from the power level of the noisy signal. Thus the amplitude of the oscillation of the useful reception signal 3 is determined.

In another advantageous embodiment, the determination of the phases of the reception signals E1, E2 . . . is performed by means of a comparison of the phase of a reference phase code contained in the data stream transmitted on the transmitter side with the same reference phase code stored in memory on the receiver side. With this design, the phases of the reception signals E1, E2 . . . are determined, one after the other, during reception of the reference phase code, in each instance. This determination occurs during the time between reception of the reference phase code, wherein the antenna combination last used for reception and its phasing is set for reception of the data until the phases of all reception signals E1, E2 . . . that can be used for reception because of their sufficiently high signal to noise ratio (SNR) have been determined. After determination of the phases of the useful reception signals 3 of the reception signals E1, E2 . . . , their equiphasing is performed immediately, in a direct time sequence.

Figure 4:
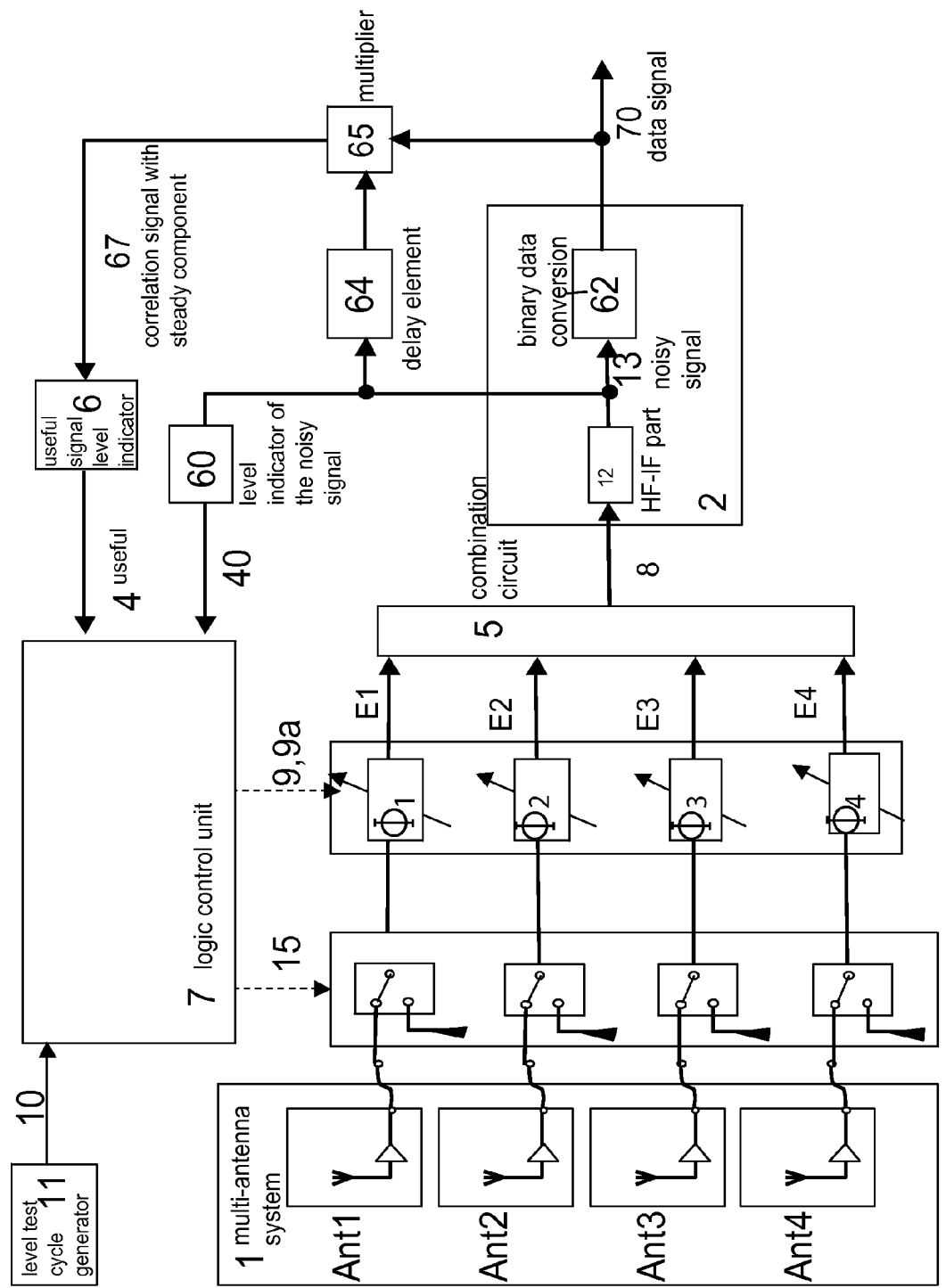
FIG. 4 shows a reception system as in FIG. 3, whereby the true useful reception signal, freed of the noise signal, to a great extent, is obtained from the noisy reception signal by means of correlation with the digital code at the output of the multiplier.

FIG. 4 shows another embodiment, wherein the selection of the useful reception signal 3 is performed so that the data signal 70 is correlated with the noisy signal 13 after the binary data conversion 62, in the multiplier 65. For equalizing the signal running time in the binary data conversion 62, a time delay element 64 is present, in which the data signal 70 is first synchronized with the noisy signal 13, so that the maximal value of the complex correlation corresponds to the level of the useful reception signal 3. The level of the useful reception signals 3, 67 that are present at the output of the multiplier 65 is determined in a useful signal level indicator 6 that is preferably configured as an integrator with low-pass function, and passed to the logic control unit 7.

In this method of procedure, one benefit is that the data signal 70 has already been freed, to a great extent, of the effect of the noise component in the noisy signal 13, and that its correlation signal with steady component 67, after integration in the useful signal level indicator 6 with low-pass function, accurately represents the useful signal level 4, to a great extent, by means of synchronized correlation of these two signals in the multiplier 65.

In another advantageous embodiment, the determination of the noise signal level 23 in the combined signal 8 occurs by means of determining the noise within a frequency interval that lies directly adjacent to the reception frequency channel but does not contain spectral components of the signal transmitted by the satellite. In the case of sufficient frequency bandwidth of the multi-antenna system 1, which additionally covers this frequency interval, the noise signal level in this interval can be detected by means of tuning the HF-IF part 12 (tuner) of the subsequent receiver circuit 2 to this frequency interval, and the noise signal level 23 in the reception frequency channel can be representatively detected from this. In the same manner, the noise signal level 23 can be determined by means of a separate reception circuit tuned to this frequency interval.

Because of the unmodulated amplitude of the sine-shaped high-frequency oscillation of the combined reception signal 8 and the useful signal level 4 that results from it, is independent of the phase modulation, this level can be indicated from the total power of the reception signal 8 minus the noise power in the reception frequency channel. Equiphasing of the useful reception signals 3 as described above can take place using useful signal levels 4 of the reception signals E1, E2, . . . EN determined separately for the individual antennas, and sorting out those reception signals E1, E2, . . . EN that have an overly poor signal/noise ratio SNR. In contrast to the useful signal level 4, which varies greatly over time due to the multi-path propagation of the received electromagnetic waves, as a function of the driving speed, the noise signal level 23 in the reception signals E1, E2, . . . EN is relatively constant, so that updating of this measurement value can be performed at comparatively large time intervals. In an advantageous manner, this updating can take place, for example, within the framework of the burst signals.

To avoid alternative tuning of the HF-IF part 12 (tuner) to this frequency interval, the signal can be split up, after the frequency conversion in the HF-IF part 12, by way of two frequency bandpasses, whereby the frequency bandwidth of the one is tuned to the IF useful frequency channel, and allows only this channel to pass through, and the other frequency bandpass is tuned to the separate frequency interval and allows only this to pass through. Thus, the power level that can be detected after the bandpass first mentioned consists of the sum (P1) of the useful signal level 4 (Pnutz) and the noise power level (Pr1) that corresponds to the bandwidth (Bnutz) of the IF useful frequency channel. Accordingly, after the second bandpass mentioned, the noise power (Pr2) that corresponds to the bandwidth (Bint) of the separate frequency interval can be detected. Assuming that there is white noise in the frequency environment of the useful frequency channel, proportionality with the frequency bandwidth of the bandpass in question results for the noise power Pr1=k*Bnutz and Pr2=K*Bint.

Thus, the two detected powers P1 and Pr2 yield the useful signal level 4=Pnutz as follows:

$$Pnutz = P1 - Pr2 \times \frac{Bnutz}{Bint}$$

The two powers P1 and Pr2 can therefore be detected at the same time, so that determination of the useful signal level 4 (Pnutz), for example in the logic control unit 7, is present in real time at every moment. On the basis of the useful signal level 4 determined in this way, each of the reception signals of the antennas Ant1, Ant2 . . . AntN can be used in accurate manner, for equiphasing of the useful reception signals 3, for example, according to one of the methods indicated in DE 10 2006 057 520, the disclosure of which is hereby incorporated herein by reference.

Another possibility that is advantageous because of its simplicity consists in the use of two bandpasses having different bandwidths Bnutz and B2, with B2>Bnutz, the center frequency of which is equal to the center frequency of the IF useful frequency channel, in each instance, and Bnutz covers at least the useful frequency channel. With the detected power P1 at the output of the bandpass first mentioned, and the detected power P2 at the output of the bandpass mentioned second, the useful signal level 4=Pnutz results from the two detected powers $P1=Pnutz+k\cdot Bnutz$ and $P2=Pnutz+k\cdot B2$ and the ratio of the two bandwidths as follows:

$$Pnutz = \frac{P1 - P2 \cdot \frac{Bnutz}{B2}}{1 - \frac{Bnutz}{B2}}$$

The determination of the useful signal level 4=Pnutz can be performed with greater precision, with the greater the ratio B2/Bnutz that can be selected. However, this ratio experiences its limitation due to the availability, which is generally rather restricted, of the frequency ranges adjacent to the useful frequency channel and free of other radio services, so that only correspondingly narrow separate frequency intervals can be used. In the event that such frequency intervals are not available, due to spectral occupation by adjacent radio services, the determination of the useful signal level 4 can be determined as described in connection with FIG. 4.

Figure 5:
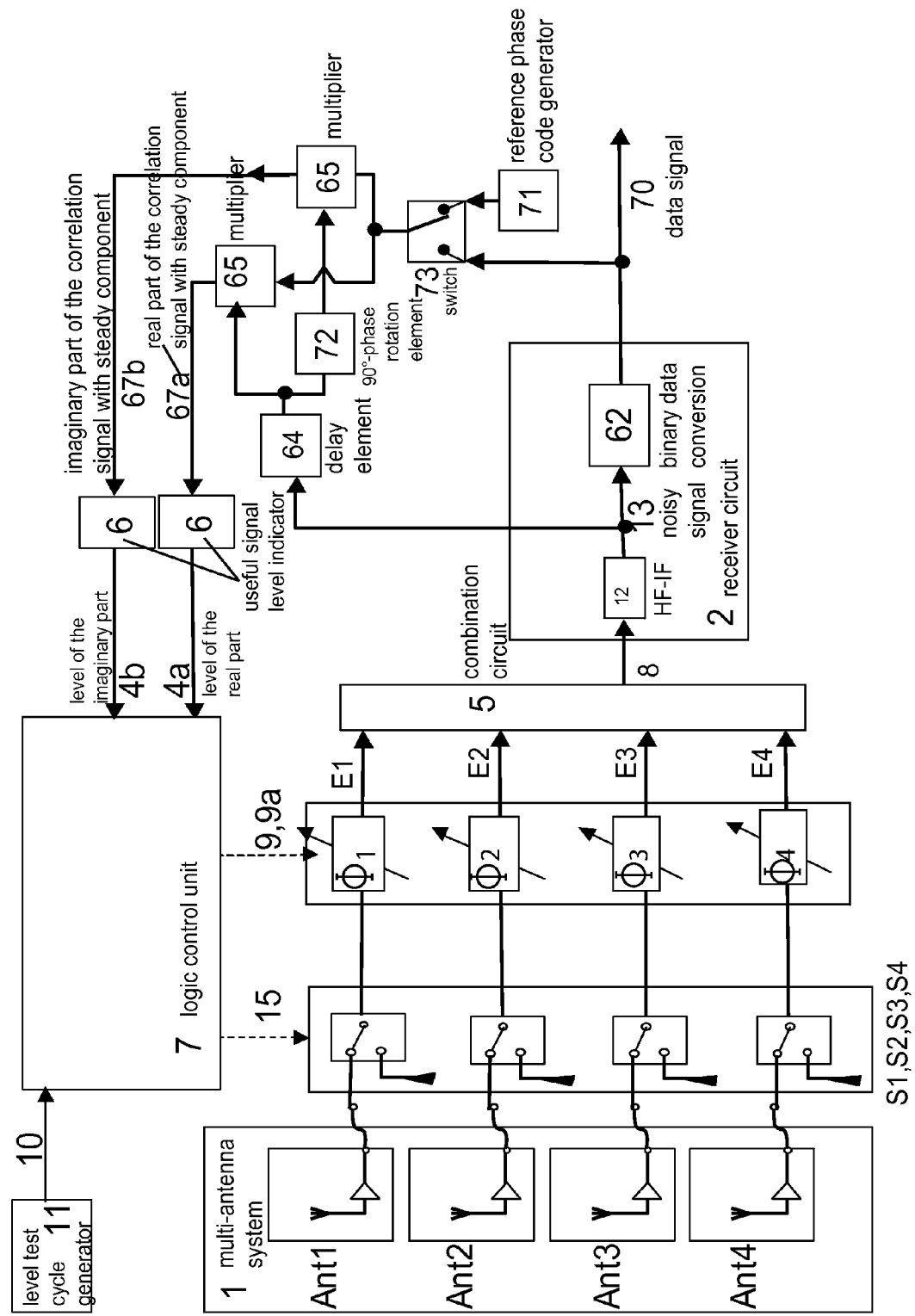
FIG. 5 shows a reception system as in FIG. 4, with separate multipliers for separate determination of the level of the real part and of the level of the imaginary part of the useful reception signal in the combined signal.

FIG. 5 shows another advantageous embodiment. In this embodiment, the determination of the phases of the useful reception signals 3 of the reception signals E1, E2 . . . in FIG. 5 occurs during transmission of the reference phase code, by means of complex correlation of the reference phase code contained in the reception signal E1, E2 . . . EN with a reference phase code generated in a reference phase code generator 71. In this connection, the complex value of the maximum of the complex correlation function describes the level of the useful reception signal 3, in terms of its amount, and its angle argument describes the phase of the useful reception signal 3 of the reception signal E1, E2 . . . EN that was just considered. For this purpose, the reception signal 61, 67 with the reference phase code contained in it can be parallelized in an advantageous logic circuit, whereby this is multiplied once directly and once parallel, by way of a 90° phase rotation element 72, with the reference phase code issued by the code generator 71, in each instance.

The resulting real part of the useful signal with reference phase code or correlation signal with steady component 67a, and the imaginary part of the useful signal with reference phase code, or correlation signal with steady component 67b, are given to the control element 7 by way of a useful signal level detector 6, in each instance, as the real part 4a and imaginary part 4b of the complex level of the reference phase code contained in the reception signal 61. To set the maximum of the correlation function, it is advantageous to set the time delay T in the delay element 64 so that the reference phase code contained in the reception signal 61 is synchronous with the reference phase code issued by the receiver-side code generator, or reference phase code generator 71. The functional elements for this correlation can also be used for determining the useful signal levels 4 of the reception signals E1, E2 . . . or their superimposition. For this purpose, the position of the switch 73 is changed.

Figure 6:
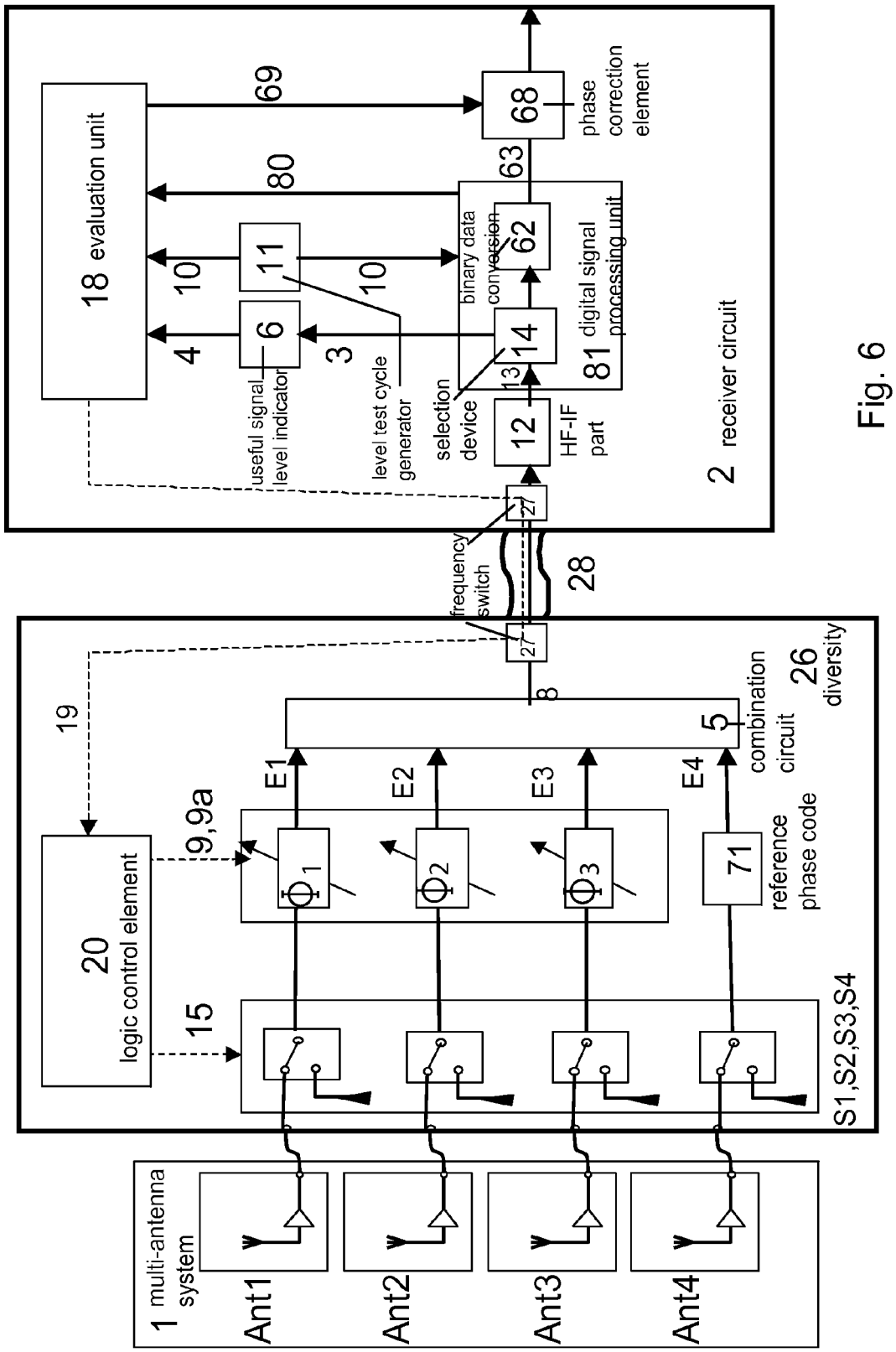
FIG. 6 shows a block diagram of a reception system as shown in FIG. 1, but with a receiver circuit formed by a receiver produced in mass production, and a separate diversity unit, which contains a simple switching logic, the switching elements and the phase rotation elements with a combination circuit.

FIG. 6 shows another advantageous embodiment with a reception system, having a receiver circuit 2 produced in mass production, and a separate diversity unit 26 which is configured with a logic control element 20 as well as the switching elements S1, S2 . . . and the phase rotation elements Φ1, Φ2 . . . with a combination circuit 5. The determination of the phases and the levels is performed in receiver circuit 2. As an example of this, the selection device 14 and the binary data conversion 62 are combined into a digital signal processing unit 81, which stands in connection with an evaluation unit 18. The determination of the switching and phase settings to be performed, to be set in a diversity unit 26 assigned to the antennas Ant2 . . . AntN, is performed in the evaluation unit 18. For this purpose, the evaluation unit 18 transmits a control signal 19 to a logic control element 20 situated in the diversity unit 26, for setting the switches and phase shifters, which signal is transmitted using frequency switches 21, by way of the receiver line 28 between the receiver 2 and the diversity unit 26.

Ultimately, with any one of the appropriate embodiments, the logic unit 7, or logic unit 20 is configured to perform the following basic steps including: conducting a test cycle, switching the different individually adjustable switching elements S1, S2 etc.; recording phase deviations of useful reception signals in a time interval wherein these phase deviations are recorded from the receiver, and then setting the phase rotation elements so that all of the useful reception signals assume a common phase in the form of a nominal phase resulting in the optimal signal to noise ratio.

In addition the logic control unit 7, or logic unit 20 can also perform the step of correcting a phase deviation ΔΦ of the useful reception signal in the combined signal 8 that results from the test cycle, so that a phase correction element 68 is present in the reception branch, after the combination circuit 5, which is configured to receive a phase correction signal. In this case, the signal is derived from a phase deviation ΔΦ, of the nominal phase of the useful reception signal 3 in the combined signal, which is determined in the receiver, between reference symbols received before and after the test cycle having the same reference phase 80, so that a phase modulated combined signal 8 is not distorted by equiphasing.

Furthermore, the logic control unit 7 or 20 can also be configured to perform the step of determining the phase deviation ΔΦ of the useful reception signal 3 in the combined signal 8 based upon a received reference phase 80 received from the receiver circuit 2. This reference phase 80 can be determined as an average value of the individual phase deviations from the reference phase 80 of the group of reference symbols of a code word, when there is a transmitter side transmission of a burst signal having a series of reference symbols in the form of a code word with a known but different reference phase 80, in each instance in the form of a code word.

In addition, the logic control unit can also be configured to perform the following steps:

conducting a test cycle in a successive manner, and wherein with the step of switching, only one of the reception signals is switched through in each instance, using the switch setting signals;

wherein the step of passing the phase deviation ΔΦ to the logic control unit 7 or 20 includes passing it as a phase difference $α_i$ by means of which element the phase value of the phase rotation element is suitable for setting the phase difference substantially to zero, wherein the process further comprises equiphasing of all signals after cyclical treatment of all reception signals wherein an entire test cycle occurs for equiphasing of all useful reception signals during reception of a burst signal, using the reference symbols contained in it.

In at least one embodiment, the logic control unit 7 or 20 has a memory 7a and is configured to switch through only one reception signal in each instance during reception of the reference symbols transmitted on the transmitter side, with the known reference phases 80 assigned to them, and within the test cycle. Thus the phase of the signal 8 of the antenna in question is determined in the receiver 2 and stored in the memory of the logic control unit, wherein the logic control unit 7 or 20 is configured to perform this process for all of the antennas $A_n$ until phases of all of the antennas useful reception signals have been stored in memory, wherein the step of equiphasing of the antenna useful reception signals occurs by means of the logic control unit setting the phase rotation elements.

In addition, in at least one embodiment, the logic control unit 7 or 20 selects a time interval $T_z$ between the level test cycle signals 10 which are selected by logic control unit 7 or 20 to be sufficiently short so that a distance traveled during this time interval $T_z$ is not greater than ¼ of the length of a high frequency carrier wave.

In at least another embodiment, the logic circuit 7 or 20 has a memory 7a which is configured to store an algorithm 16 in the memory and wherein the logic circuit 7 or 20 is configured such that the step of conducting a test cycle comprises providing a test cycle signal 10 for determining a phase difference $\alpha_i$ of the reception signals E1, E2 present at the input of combination circuit 5. In addition in this embodiment, the logic circuit 7 or 20 is configured to perform the following additional steps:

determining the phase difference $\alpha_i$ of the reception signals via the following steps:
calculating a first two useful signal level samples 4 by alternately closing two switching elements S1, S2, of a first and second antenna A1, A2, wherein useful signal level samples are obtained while simultaneously closing the switching elements S1, S2 that belong to these two antennas A1, A2 while leaving all other switching elements in an open state.

The next step includes determining a phase difference between reception signals taken from the first and second antenna A1, A2, by calculating three useful signal level samples and equiphasing two reception signals E1, E2 which results from setting of the phase rotation element φ2.

The next step includes switching at least one additional antenna $E_n$ via at least one additional switching element $S_n$, for successive equiphasing of a reception signal of the at least one additional antenna while maintaining a setting of the phase rotation elements Φ1, Φ2, which are switched in a same direction. In this case, the first two antennas A1, A2 are combined such that this combination takes the place of the first antenna A1 with respect to equiphasing wherein the additional switching element of the at least one additional antenna $A_n$ is set in accordance with the previously set second antenna for determining corresponding useful signal level samples.

The next step involves equiphasing of the reception signals at the input to the combination circuit by means of setting the phase rotation element $\Phi_n$ of the additional antenna on the basis of the phase difference determined, until equiphase superimposition for all remaining reception signals in the combined signal have been produced by a repeating process.

In this or in other embodiments, logic circuit 7 or 20 can be configured to perform the following additional steps:
selecting a useful reception signal relative to the noise signal;
storing a noise level of the reception system in a memory in logic control circuit 7 or 20;
measuring a power level of noisy reception signals E1, E2, E3, and E4;
determining the power useful signal level 4 of the useful reception signal, wherein the noise power level is subtracted from the power level of the noisy signal.

In at least one additional embodiment, the system can also include a plurality of amplifiers, including a reference amplifier and a plurality of antenna amplifiers. These amplifiers can be used by the logic circuit to determine a noise power level via the reference amplifier, wherein the logic circuit can also be configured to detect a power of a reference amplifier; measure a power of the noisy reception signal of an antenna which is determined by addition, via an adjustable switching element and by means of detection of its signal power.

In at least one embodiment, logic circuit 7 or 20 is configured to perform the following additional steps: determining a noise power level via the reference amplifier by detecting a power of the reference amplifier; and measuring the power of the noisy reception signal of an antenna which is determined by addition by means of the adjustable switching elements S1 . . . of the antenna A1 and by means of its signal power.

At least one embodiment, the logic control unit 7 or 20 is configured to perform the following steps: tuning a noise level indicator to a frequency interval which is structured in a frequency selective manner, wherein the noise signal level in the reception frequency channel is representatively detected from this; and determining a useful signal level of one of the reception signals by means of detecting its total power.

At least one embodiment the system further comprises at least two frequency bandpasses having different bandwidths Bnutz and B2 with B2>Bnutz, wherein the two frequency bandpasses cover an IF useful frequency channel with their pass through frequency ranges. In this embodiment, logic circuit 7 or 20 is configured to perform the following steps: detecting a power at the output of the frequency bandpass, and a power at the output of the bandpass; determining a useful signal level from the two powers and the ratio of the bandwidths (Bnutz/B2) in the logic switching device; equiphasing the useful reception signals using the algorithm using useful signal levels.

In at least one embodiment, the system further comprises a signal multiplier having an input coupled to an output of a receiver 2, wherein the logic circuit 7 or 20 is configured to perform the following steps: a) selecting a useful reception signal such that a data signal is correlated with a noisy signal; b) forming a correlation signal with a steady component, wherein the component results in a value of the auto correlation of an amplitude of the phase modulated oscillation in the noisy signal, by means of integration in terms of time in the level detector, with a low pass function, and thus corresponds to the level of the useful reception signal.

In at least one additional embodiment, the logic circuit 7 or 20 is configured to determine the phase of the reception signals E1, etc. by comparing the phase of a reference phase code contained in the data stream transmitted on the transmitter side with the same reference phase code stored in memory on the receiver side. Logic circuit 7 or 20 can also perform the steps of: determining the phases of the reception signals during the reception of the reference phase code, one after the other during reception of the reference phase code. The process can also include setting the antenna combination last used for reception such that its phasing are set for reception of the data during the time between reception of the reference phase codes, until the phases of all reception signals that can be used for reception because of their sufficiently high signal to noise ratio (SNR). The process can also include the step of and equiphasing of the signals after determination of the phases of the useful reception signals.

In at least one additional embodiment, the system further comprises a reference code generator 71, wherein the reference code generator 71 is configured to generate a reference code and wherein the logic circuit 7 or 20 is configured to perform the following steps: determining the phases of the useful reception signals during transmission of the reference phase code contained in said reception signals. The steps also include determining a useful signal level which is given by a complex value of the maximum of the complex correlation function and by its amount; and wherein the phase of the useful reception signal of the reception signal being considered is given by its angle argument.

In at least one additional embodiment, the receiver circuit 2 further comprises an evaluation unit 18, and wherein the system further comprises a diversity unit 26, a logic control element 20, and a receiver line 28 wherein evaluation unit 18 performs the following functions: determining the phases and signal levels; determining the switching and phase settings to be performed; transmitting a signal to a logic control element 7 or 20 setting at least one switch S1 . . . SN and said at least one phase shifter Φ1 . . . ΦN, wherein said signal is transmitted via receiver line 28 between receiver circuit 2 and diversity unit 26 using frequency switches S1 . . . SN.

Accordingly, while at least one embodiment of the present invention has been shown and described, it is to be understood that many changes and modifications may be made thereunto without departing from the spirit and scope of the invention as defined in the appended claims.

Reception System for Summation of Phased Antenna Signals

LIST OF REFERENCE SYMBOLS

Multi-antenna system 1
Receiver circuit 2
Useful reception signals 3
Useful signal level 4
Level of the real part 4a
Level of the imaginary part 4b
Combination circuit 5
Useful signal level indicator 6
Logic control unit 7
Combined signal 8
Phase setting signal 9
Period cycle 10
Level test cycle generator 11
HF-IF part 12
Noisy signal 13
Selection device 14
Switch setting signals 15
Algorithm 16
. . . 17
Evaluation unit 18
Control signal 19
Logic control element 20
Noise signal 21
Noise signal level indicator 22
Noise signal level 23
Diversity unit 26
Frequency switch 27
Receiver line 28
Level indicator of the noisy signal 60
Binary data conversion 62
Digital code 63
Delay element 64
Multiplier 65
Correlation signal with steady component 67
Real part of the correlation signal with steady component 67a
Imaginary part of the correlation signal with steady component 67b
Phase correction element 68
Phase correction signal 69
Data signal 70
Reference phase code generator 71
90°-phase rotation element 72
Reference phase 80
Digital signal processing unit 81
Antennas Ant1, Ant2 . . . AntN,
Switching elements S1, S2.
Travel routes
Burst signal period TB
Frame period TR
Level test cycle time interval $T_z$
Reception signals E1, E2 . . . EN
Phase rotation elements Φ1, Φ2 . . .
Level test period $T_p$
Phases $Φ_i$ of the reception signals E1, E2 . . . EN
Phase difference $α_i$
Phase change value of the reception signal 8 before and after equiphasing ΔΦ

The invention claimed is:

1. A reception system for frequency modulated or phase modulated high frequency signals for vehicles comprising:
a multi antenna system, comprising at least two antennas (A1, A2);
at least one individually adjustable phase rotation element Φ1 situated in a reception path of at least one of said at least two antennas;
a linear combination circuit (5) for combining signals from said at least two antennas;
a receiver circuit (2) for receiving signals from at least one of said at least two antennas;
at least one individually adjustable switching element (S1, S2) for switching through or interrupting a signal flow from at least one of said at least two antennas, wherein said at least one switching element is positioned in a signal path of at least one of said at least two antennas;
wherein said at least one individually adjustable phase rotation element and said at least one individually adjustable switching element are in communication with said linear combination circuit (5) to form a combined signal wherein said combined signal is passed to said receiver circuit (2);
a selection device (14) disposed in said receiver circuit (2) for extensively separate determination of said reception signal and for determination of a noise signal (21) of said combined signal, for separate determination of a useful signal level (4) and a noise signal level (23);
a plurality of test circuits implemented by settings of said switching element and at least one individually adjustable phase rotation element at a period Tz of the test circuits of less than approximately 100 symbol lengths of the data signal to be transmitted;
a logic unit (7) for subsequent determination of a signal-to-noise ratio (SNR);
wherein said logic unit is configured to determine useful signal levels of the individual reception signals (e1, e2) by performing the following steps:
conducting a test cycle;
switching said individually adjustable switching element of only one reception signal (E1, E2) in each instance of said at least two antennas, within a scope of said test cycle, wherein as a criterion for the further setting process, only those signals are selected wherein a signal to noise ratio (SNR) exceeds a required minimum measure;

recording phase deviations of the useful reception signals (4) from one another in a fixed text cycle time interval (Tz) that are sufficiently small in comparison with a ratio of a wavelength to a travel speed, wherein said step of determining phase deviations occurs one after the other to determine phase deviations for each successive antenna;

setting said phase rotation elements (Φ1, Φ2), controlled by said logic control circuit (7), so that all of a set of useful reception signals of said reception signals assume a substantially common phase.

2. The reception system as in claim 1, further comprising a digital signal processor positioned at an output of said selection device, wherein said digital signal processor is configured to determine the phase deviations of the useful reception signals (3) of the reception signals (E1, E2) from one another, wherein said logic unit (7) is configured to perform the step of determining the phase deviation ΔΦ after the test cycles, wherein said phase deviation ΔΦ is balanced out;

wherein said receiver is configured to pass the phase deviation ΔΦ to said logic control unit (7) to perform said step of setting said phase rotation elements (Φ1, Φ2) such that they substantially equalize, thereby causing all useful antenna reception signals (3) to assume a substantially common nominal phase comprising a reference phase.

3. The reception system as in claim 1, wherein said logic control unit is configured to perform the following step:

correcting a phase deviation ΔΦ of the useful reception signal in said combined signal (8) that results from said test cycle, so that a phase correction element (68) is present in the reception branch, after said combination circuit, which is configured to receive a phase correction signal, wherein said phase correction signal is derived from a phase deviation ΔΦ, of the nominal phase of said useful reception signal (3) in said combined signal, which is determined in said receiver, between reference symbols received before and after said test cycle having a same reference phase (80), so that a phase modulated combined signal (8) is not distorted by equiphasing.

4. The reception system as in claim 2, wherein said logic control unit (7) is configured to perform said step of determining a phase deviation ΔΦ of said useful reception signal (3) in said combined signal (8) based upon a received reference phase (80) received from said receiver, and is determined as an average value of the individual phase deviations from said reference phase (80) of the group of reference symbols of a code word, when there is a transmitter side transmission of a burst signal having a series of reference symbols in the for in of a code word with a known but different reference phase (80), in each instance in the form of a code word.

5. The reception system as in claim 2, wherein said logic circuit is configured to perform the step of conducting a test cycle in a successive manner, and wherein with said step of switching, only one of said reception signals is switched through in each instance, using said switch setting signals;

wherein said step of passing said phase deviation ΔΦ to said logic control unit includes passing it as a phase difference ai by means of which element the phase value of the phase rotation element is suitable for setting the phase difference substantially to zero, wherein the process further comprises equiphasing of all signals after cyclical treatment of all reception signals wherein an entire test cycle occurs for equiphasing of all useful reception signals during reception of a burst signal, using said reference symbols contained in it.

6. The reception system as in claim 5, wherein said logic control unit has a memory and is configured to switch through only one reception signal in each instance during reception of the reference symbols transmitted on the transmitter side, with the known reference phases (80) assigned to them, and within the test cycle, thus, the phase of the signal (8) of an antenna in question is determined in said receiver and stored in said memory of said logic control unit, wherein said logic control unit is configured to perform this process for all of said antennas until phases of all of said antennas useful reception signals have been stored in memory, wherein said step of equiphasing of said antenna useful reception signals occurs by means of said logic control unit setting said phase rotation elements.

7. The reception system as in claim 1, wherein said logic control unit selects a time interval (Tz) between a set of level test cycle signals (10) which are selected by said logic control unit to be sufficiently short so that a distance traveled during this time interval (Tz) is not greater than ¼ of the length of a high frequency carrier wave.

8. The reception system as in claim 1, wherein said logic circuit has a memory which is configured to store an algorithm in said memory and wherein said logic circuit is configured such that said step of conducting a test cycle comprises providing a test cycle signal (10) for determining a phase difference ai of said reception signals (e1, e2) present at the input of said combination circuit, and wherein said logic circuit is configured to perform the following additional steps:

determining the phase difference ai of said reception signals via the following steps:

calculating a first two useful signal level samples (4) by alternately closing two switching elements (S1), (S2), of a first and second antenna, wherein useful signal level samples are obtained while simultaneously closing the switching elements (S1, S2) that belong to these two antennas (a1, a2) while leaving all other switching elements in an open state;

determining a phase difference between reception signals taken from said first and second antenna, by calculating three useful signal level samples and equiphasing two reception signals (E1, E2) which results from setting of the phase rotation element (Φ2):

switching at least one additional antenna via at least one additional switching element of said plurality of switching elements, for successive equiphasing of a reception signal of said at least one additional antenna while maintaining a setting of said phase rotation elements (Φ1, Φ2), which are switched in a same direction, wherein said signals from said first two antennas (A1, A2) are combined such that this combination takes the place of a signal of said first antenna with respect to equiphasing wherein said additional switching element of said at least one additional antenna is set in accordance with said previously set second antenna for determining corresponding useful signal level samples;

equiphasing of the reception signals at the input to the combination circuit by means of setting the phase rotation element of the additional antenna on the basis of the phase difference determined, until equiphase superimposition for all remaining reception signals in the combined signal have been produced by a repeating process.

9. The reception system as in claim 8, wherein said logic circuit is configured to perform the following additional steps:
   selecting a useful reception signal relative to the noise signal
   storing a noise level of the reception system in a memory in said logic control circuit;
   measuring a power level of said noisy reception signal (e1, e2, e3, and e4); and
   determining the power useful signal level (4) of the useful reception signal, wherein said noise power level is subtracted from the power level of the noisy signal.

10. The reception system as in claim 1, further comprising a plurality of amplifiers comprising at least one reference amplifier and a plurality of antenna amplifiers;
    wherein said logic circuit is configured to perform the following additional steps:
      a) determining a noise power level via said at least one reference amplifier;
      b) detecting a power of said reference amplifier;
      c) measuring a power of the noisy reception signal of an antenna which is determined by addition, via said adjustable switching elements and by means of detection of its signal power.

11. The reception system as in claim 1, further comprising a plurality of amplifiers comprising at least one reference amplifier and a plurality of antenna amplifiers;
    wherein said logic circuit, is configured to perform the following additional steps:
      determining a noise power level via said reference amplifier by detecting a power of said reference amplifier;
      measuring the power of the noisy reception signal of an antenna which is determined by addition by means of said adjustable switching elements of said antenna and by means of its signal power.

12. The reception system as in claim 1 further comprising a noise level indicator wherein said logic circuit is configured to perform the following steps:
    wherein said step of determining a noise signal level in a combined signal within a frequency interval that lies directly adjacent to a reception frequency channel but does not contain spectral components of a signal transmitted by a satellite, wherein a frequency bandwidth of the multi-antenna system additionally covers this frequency interval;
    tuning a noise level indicator to a frequency interval which is structured in a frequency selective manner, wherein said noise signal level in said reception frequency channel is representatively detected from this; and
    determining a useful signal level of one of the reception signals by means of detecting its total power.

13. The reception system as in claim 1, wherein the system further comprises at least two frequency bandpasses having different bandwidths Bnutz and B2 with B2>Bnutz, wherein said two frequency bandpasses cover an 1F useful frequency channel with their pass through frequency ranges and wherein said logic circuit is configured to perform the following steps:
    a) detecting a power at the output of at a first frequency bandpass, and a power at the output of a second bandpass;
    b) determining a useful signal level from said two powers and the ratio of the bandwitdhs (Bnutz/B2) in said logic switching device; and
    c) equiphasing the useful reception signals using said algorithm using useful signal levels.

14. The reception system as in claim 1, further comprising a signal multiplier having an input coupled to an output of a receiver, wherein said logic circuit is configured to perform the following steps:
    a) selecting a useful reception signal such that a data signal is correlated with a noisy signal; and
    h) forming a correlation signal with a steady component wherein said component results in a value of the auto correlation of an amplitude of the phase modulated oscillation in the noisy signal, by means of integration in terms of time in said level detector, with a low pass function, and thus corresponds to the level of the useful reception signal.

15. The system as in claim 1, wherein said logic circuit is configured to perform the following steps:
    a) determining the phase of the reception signals by comparing the phase of a reference phase code contained in the data stream transmitted on the transmitter side with the same reference phase code stored in memory on the receiver side;
    b) determining the phases of the reception signals during the reception of the reference phase code, one after the other during reception of the reference phase code;
    c) setting the antenna combination last used for reception and its phasing are set for reception of the data during the time between reception of the reference phase codes, until the phases of all reception signals that can be used for reception because of their sufficiently high signal to noise ratio (SNR); and
    d) equiphasing of said signals after determination of the phases of the useful reception signals.

16. The reception system as in claim 5, further comprising a reference code generator, wherein said reference code generator is configured to generate a reference code and wherein said logic circuit is configured to perform the following steps:
    a) determining the phases of the useful reception signals during transmission of said reference phase code contained in said reception signals;
    b) determining a useful signal level which is given by a complex value of the maximum of the complex correlation function and by its amount; and
    wherein said phase of said useful reception signal of said reception signal being considered is given by its angle argument.

17. The reception system as in claim 1, wherein said receiver circuit further comprises an evaluation unit, and wherein the system further comprises a diversity unit, a logic control element (20), and a receiver line wherein said evaluation unit performs the following functions:
    determining phases and signal levels for each antenna;
    determining the switching and phase settings to be performed;
    transmitting a signal to a logic control element;
    setting said at least one switch and said at least one phase shifter, wherein said signal is transmitted via said receiver line between the receiver circuit and said diversity unit using said frequency switches.

18. The reception system as in claim 1, wherein said fixed text cycle time interval Tz between the level test cycle signals are sufficiently short, so that the route traveled during this time interval Tz does not amount to more than ⅕ of the length of the high-frequency carrier wave.

19. The reception system as in claim 1, wherein said fixed text cycle time interval Tz between the level test cycle signals are sufficiently short, so that the route traveled during this time interval Ti does not amount to more than ¹⁄₁₅ of the length of the high-frequency carrier wave.

20. A process for obtaining a maximal signal to noise ratio of a received signal in a diversity antenna system comprising the following steps:
  providing a multi antenna system, comprising 4 leas two antennas (A1, A2):
  positioning at least one individually adjustable phase rotation element Φ1 in a reception path of at least one of said, at least two antennas;
  providing a linear combination circuit (5) for combining signals from said at least two antennas;
  providing a receiver circuit (2) for receiving signals from at least one of said at least two antennas,
  wherein at least one individually adjustable switching element (S1, S2) for switching through or interrupting a signal flow from at least one of said at least two antennas, wherein said at least one switching element is positioned in a signal path of at least one of said at least two antennas, and
  wherein said at least one individually adjustable phase rotation element and said at least one individually adjustable switching element are in communication with said linear combination circuit (5) to form a combined signal wherein said combined signal is passed to said receiver circuit (2);
  providing a selection device (14) disposed in said receiver circuit (2) for extensively separate determination of said reception signal and for determination of a noise signal (21) of said combined signal, for separate determination of a useful signal level (4) and a noise signal level (23);
  providing a plurality of test circuits implemented by settings of said switching element and at least one individually adjustable phase rotation element at a period Tz of the test circuits of less than approximately 100 symbol lengths of the data signal to be transmitted; and
  providing a logic unit (7) for subsequent determination of a signal-to-noise ratio (SNR), wherein said logic unit is configured to determine useful signal levels of the individual reception signals (e1, e2) by performing the following steps:
conducting a test cycle;
switching said individually adjustable switching element of only one reception signal (e1, e2) in each instance of said at least two antennas, within a scope of said test cycle, controlled by said logic control unit (7), wherein as a criterion for the further setting process, only those signals are selected wherein a signal to noise ratio (SNR) exceeds a required minimum measure;
recording phase deviations of the useful reception signals from one another in a fixed text cycle time interval (Tx) that are sufficiently small in comparison with a ratio of a wavelength to a travel speed, wherein said step of determining phase deviations occurs one after the other to determine phase deviations for each successive antenna; and
setting said phase rotation elements (p1, p2), controlled by said logic control circuit, so that all of a set of useful reception signals of said reception signals assume a common phase in the form of a nominal phase, resulting in a maximal signal to noise ratio.

\* \* \* \* \*